United States Patent
Beukema et al.

[19]

[11] Patent Number: 6,128,510
[45] Date of Patent: *Oct. 3, 2000

[54] CORDLESS CONNECTION FOR A DATA/FAX MODEM

[75] Inventors: Troy James Beukema, Peekskill, N.Y.; Michael Frank Cina, Elizabethtown, Pa.; Ephraim Bemis Flint, Garrison, N.Y.; Brian Paul Gaucher, New Milford, Conn.; Young Hoon Kwark, Chappaqua, N.Y.; Modest Michael Oprysko, Mahopac, N.Y.; William Edward Pence, New York, N.Y.; Saila Ponnapalli, Fishkill, N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,502

[22] Filed: May 13, 1997

Related U.S. Application Data

[63] Continuation-in-part of application No. 08/589,077, Jan. 23, 1996.

[51] Int. Cl.[7] ...................................................... H04Q 7/20
[52] U.S. Cl. .......................... 455/557; 455/556; 455/575; 455/426; 455/465
[58] Field of Search .................................. 455/556, 557, 455/575, 462, 112, 560, 426, 66, 465, 74, 74.1; 375/200, 208, 219, 222

[56] References Cited

U.S. PATENT DOCUMENTS

| | | | |
|---|---|---|---|
| 3,856,986 | 12/1974 | Macovski | 348/40 |
| 4,203,070 | 5/1980 | Bowles et al. | 375/340 |
| 4,550,414 | 10/1985 | Guinon et al. | 375/207 |
| 4,817,192 | 3/1989 | Phillips et al. | 455/75 |
| 5,052,020 | 9/1991 | Koenck et al. | 375/62 |
| 5,517,552 | 5/1996 | Yamashita | 455/556 |
| 5,553,138 | 9/1996 | Heald et al. | 455/572 |
| 5,793,843 | 8/1998 | Morris | 379/420 |
| 5,805,678 | 9/1998 | Okamoto et al. | 455/462 |
| 5,809,395 | 9/1998 | Hamilton-Piercy et al. | 455/4.1 |
| 5,812,604 | 9/1998 | Herbst et al. | 280/655.1 |

*Primary Examiner*—Daniel S. Hunter
*Assistant Examiner*—Yemane Woldetatios
*Attorney, Agent, or Firm*—Whitham, Curtis & Whitham; Paul J. Otterstedt, Esq.

[57] ABSTRACT

A cordless modem comprises a radio pair interfaced to a standard data/fax modem which allows a user of a personal computer to wirelessly connect to a telephone line. One end of the radio pair is a remote unit interfaced to the modem contained within the PC while the other end is a base unit connected to a standard telephone wall jack. The base unit can selectively discriminate and adjust for signals received from a telephone voice handset or data signals received from the cordless modem remote unit. Upon receiving an off-hook signal or an incoming call signal, the base unit identifies the type of data (i.e., voice or computer modem data) and adapts accordingly by placing an FM modulator in either of a narrow band deviation or a wide band deviation covering the required range of the particular signal combined with local echo. That is, when voice data is present, a low deviation, narrow filter combination is selected. If, on the other hand, the computer data from the cordless modem is detected, a higher deviation, wider bandwidth filter is selected. In addition, the remote unit switches a pre-detection filter from one mode to another depending on whether it is connected to a computer modem or to a voice handset. Security from eavesdroppers as well as the mitigation of signal fading is provided by overlaying a pseudo-random number (PN) code on the FM modulated signal.

18 Claims, 8 Drawing Sheets

(A) REMOTE UNIT

CORDLESS CONNECTION FOR A DATA/FAX MODEM

CROSS REFERENCE TO RELATED APPLICATION

This application is a continuation-in-part of U.S. patent application Ser. No. 08/589,077, filed Jan. 23, 1996.

BACKGROUND OF THE INVENTION

1. Field of the Invention

The present invention generally relates to a cordless modem and, more particularly, to a high-speed, cordless data/facsimile modem wirelessly connecting a portable computer modem to a nearby telephone jack.

2. Description of the Related Art

Cordless telephones are popular consumer items which are now found in many homes. Cordless telephones comprise a base unit connected to a standard telephone wall jack and a portable handset connected via a radio link to the base unit. The portable handset is used for talking, listening, dialing, and ringing, and the base unit is used to interface between the radio link and the telephone network. In operation, the user is free to converse on the telephone while roaming around the house, yard, or office, in the general vicinity of the base unit without being encumbered by a cord.

Due to the scarcity of usable spectrum, many countries regulate bandwidth and transmission power of radio communications. In the U.S., the Federal communications Commission (FCC) has limited cordless telephones to a maximum power in the 900 MHZ ISM band. Under current power and spectrum constraints, roaming range is about one thousand feet from the base unit. Beyond that distance, the radio signal fades and quality degrades.

Many homes and offices are also equipped with personal computers (PCs), most of which include a modem to facilitate data communications to other computers via standard telephone lines. A modem converts and compresses a high-speed, digital, serial data stream from a computer into a complex analog modulated signal that can be carried over standard telephone lines. Present modem technology makes it possible to send data streams as fast as 33.6 and 56 kbps over the telephone network. Modern modems and modem software enable the modem to perform additional functions such as the ability to send and receive facsimile data. Modems with facsimile capabilities are typically referred to simply as data/fax modems.

Standard PCs, are typically situated at fixed location, such as a desk-top, and not moved very often. The PC's modem, either internal or external to the PC, is physically connected to a standard modular telephone wall jack via a telephone cord. Hence, the user is required to operate the computer in the proximity of the wall jack since the modem is physically tied to the wall and these jacks are often not located in convenient places. Cord connections work well for most desk-top PCs installations without many drawbacks, except that perhaps a telephone wall jack may need to be installed closer to the PC so as to avoid running a long extension cord around the room. Telephone cords are, however, undesirable for portable or mobile computers, such as, for example, lap-tops, palm-tops, and notebooks, which enable computing anytime, anywhere.

Hence, it would be desirable to have a cordless modem to permit a laptop computer connected to a modem to roam from room to room similar to the way one roams with a cordless telephone handset. Unfortunately, conversational voice data and computer modem data have different bandwidth, signal fidelity requirements, and security requirements. Therefore, one cannot simply connect a modem to a cordless telephone.

SUMMARY OF THE INVENTION

It is therefore an object of the present invention to provide a cordless data/fax modem for cordlessly connecting a computer to a nearby telephone wall jack.

It is yet another object of the present invention to provide a base unit which is capable of supporting both a telephone handset and a computer fax/modem without impeding the performance of either.

It is yet another object of the present invention to provide a cordless modem which facilitates portable computer mobility and permits a user to roam freely in the vicinity of a cordless base station connected to the telephone network.

It is yet another object of the present invention to provide security from eavesdroppers as well as eliminate signal fading by overlaying a pseudo-random number (PN) code on the FM modulated signal.

According to the present invention, a cordless modem comprises a radio pair interfaced to a standard data/fax modem and to a telephone wall jack which allows a user of a personal computer to wirelessly connect to a household telephone line. One end of the radio pair is a remote unit interfaced to the modem contained within the PC while the other end is a base unit plugged into a standard telephone wall jack. This arrangement allows the user the convenience and freedom of using a PC, laptop, notebook, personal digital assistant, etc., within several hundred feet of a phone jack without being encumbered by a cord. In a typical home situation the user could initiate a call through the cordless link to an online service, work, or any other service from their kitchen, bedroom, family room, or even outdoors without having to be right next to a phone jack. To insure reliable communications, a warning alarm on the remote unit, such as a light or an audible signal, informs the user when the signal strength between the radio pair is below a threshold value.

In the preferred embodiment, the cordless modem selectively configures the filter bandwidth based on a signal being either a voice signal or a data signal. Upon receiving an off-hook signal from an incoming call, the cordless modem identifies the type of signal (i.e., voice or computer modem data) and adaptively alters the FM modulation to either a narrow band deviation for voice or a wide band deviation for data covering the required range of the particular signal combined with local echo. In addition, when voice data is present, a low deviation, narrow pre-detection filter combination is selected at the receiver. If, on the other hand, the computer data from the cordless modem is detected, a higher deviation, wider bandwidth pre-detection filter is selected.

Additionally, the base unit may be equipped with two or more spatially separated antennas to help mitigate the effects of signal fading. Encryption methods may also be used to protect the security of the computer data. A disable feature is also provided to disable the cordless voice handset while the modem remote unit is in operation and vice-versa.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
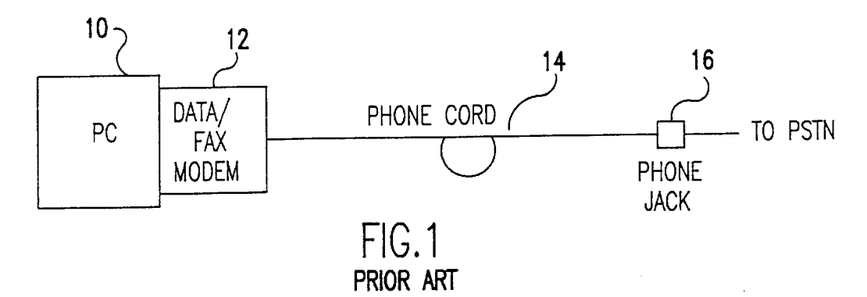
FIG. 1 is a block diagram of a telephone cord connection arrangement used to connect a typical wired modem to a telephone wall jack.

Referring now to the drawings, and more particularly to FIG. 1, there is shown a modem connected to a telephone wall jack with a telephone cord. A computer 10 is equipped with a data/fax modem 12. A physical cord 14 connects the modem 12 to a standard telephone wall jack 16 which is, in turn, connected to the telephone network. As is apparent from the illustration, since there is a physical tie between the computer 10 and the wall jack 16, mobility is severely limited.

Figure 2:
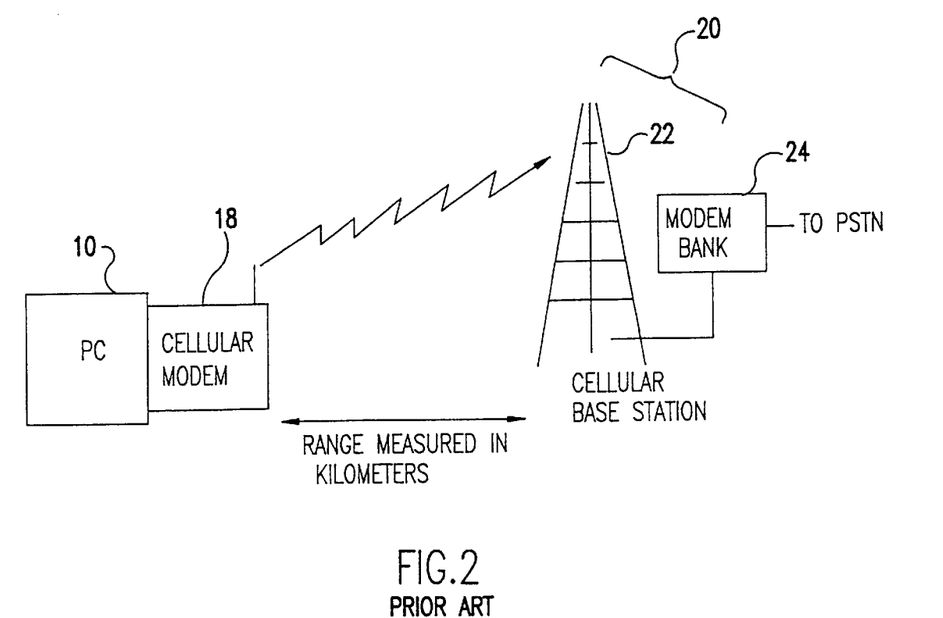
FIG. 2 is a block diagram of a cellular modem configuration allowing a computer access to a cellular telecommunications network.

FIG. 2 shows a cellular modem 18 for connecting a computer 10 to a cellular telecommunications network 20. The user must be located inside of a "cell" which is typically a several kilometers radius around a base station 22 which provides connectivity to the cellular telecommunications network which is in turn connected to a modem bank 24 and then to the standard land-line telephone network.

While a cellular modem connection offers great mobile freedom, it suffers from a limited baud rate and, further, is quite expensive relative to standard land-line telephone charges. Hence, in instances where there is access to a nearby land-line telephone jack, it would be preferable to connect to it rather than to the cellular telecommunications network.

Unlike cellular phones, cordless telephones connect to standard telephone land lines via a radio link. For cordless telephones, the FCC has set the maximum transmit power in the 900 MHZ ISM band. Therefore, transmit power is a predetermined, fixed quantity and cannot be increased. This limitation presents challenges for modem applications since, as illustrated below, cordless modem data transmission requires higher fidelity standards than does typical voice data.

SINAD (Signal In Noise And Distortion) is used as the metric to determine the performance of a radio. The SINAD is used as a measurement of communication signal quality at the baseband and to measure the FM receiver sensitivity. The SINAD of a baseband output signal is defined as the total output signal power to the power of noise plus distortion. For voice, 12 dB is considered the lowest acceptable fidelity. The higher the SINAD, the better the signal fidelity. A data/fax modem operating at 33.6 (or 56) kbps requires a minimum SINAD of 32 dB. This is obviously much higher than that required for voice. To achieve the higher SINAD the present invention modifies the FM deviation and the pre-detection filter of a cordless telephone according to the type of signal detected. The wider the deviation and filter, the higher the achievable SINAD. Correspondingly, the higher these are, the higher the threshold, or the received power required to "FM quiet" the radio (i.e. the shorter the operating range).

Figure 3:
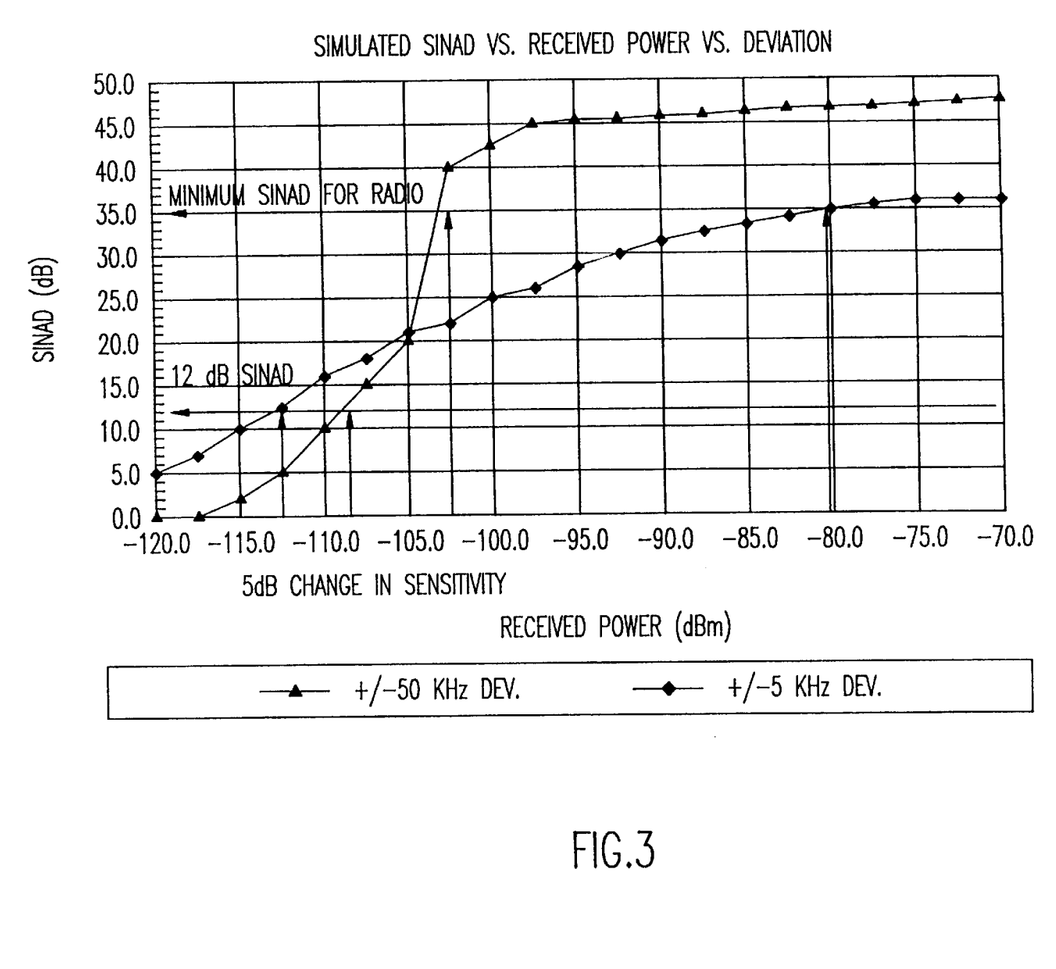
FIG. 3 is a graph showing two SINAD vs. received power curves.

FIG. 3 shows two SINAD vs. received power curves. The lower curve marked with diamonds is for an FM deviation of +/−5 KHz with a pre-detection filter of 15 KHz. The second curve, marked with triangles, is for a +/−50 KHz deviation with a 150 KHz filter. It can be seen from these curves that the +/−5 KHZ deviation achieves 32 dB SINAD at a received power of about −80 dBm, though it achieves 12 dB SINAD at −113 dBm. In contrast, the +/−50 KHz curve achieves 32 dB SINAD at a received power of −104 dBm while it reaches 12 dB SINAD at −109 dBm. Clearly, the +/−5 KHz deviation is a better choice for cordless voice transmission, while the +/−50 KHz deviation is better for modem transmissions. Free space range falls off as the power squared (e.g., if at 100 feet, power increases by 6 dB, the range would double to 200 feet). It is difficult to achieve both undegraded range performance for voice and high quality and long range for the modem.

FM modulators with deviations of up to approximately ±10 KHz can be readily achieved by directly "pulling" the crystal or with a phase-lock-loop. "Pulling" refers to adjusting the voltage applied to the crystal to shift its oscillating frequency to a new range. The larger deviations recommended for higher data rates can be achieved by techniques such as, for example, using a direct digital synthesizer (DDS), with a crystal modulator and frequency multiplier, voltage controlled oscillator (VCO) phase-lock-loop modulator, or offset upconverter with multiplier.

Figure 4:
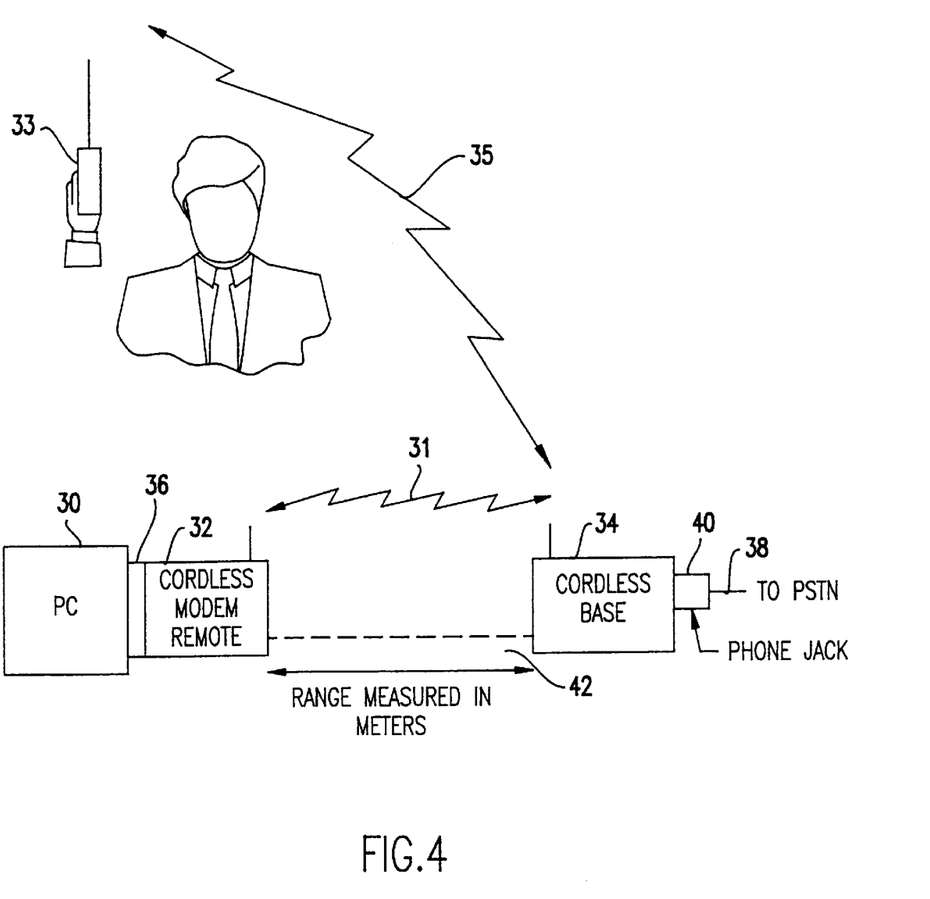
FIG. 4 is a block diagram of the cordless modem according to the present invention.

FIG. 4 shows the cordless data/fax modem according to the present invention. The cordless data/fax modem comprises a remote transceiver unit 32 which is connected via a radio link 31 to a base transceiver unit 34. The remote transceiver unit 32 is connected to a standard data/fax modem 36 which allows a user of a personal computer (PC) 30 to wirelessly connect to a telephone line 38 via a standard modular wall jack 40. Additionally, a cordless telephone handset transceiver 33 may be provided which, like the cordless data/fax modem 32, is connected via a radio link 35 to the base transceiver unit 34. The base transceiver 34 can selectively discriminate between signals received from the cordless telephone handset transceiver 33 and from the cordless modem 32. This allows the user the convenience and freedom of using both, though not concurrently, a PC modem 32 as well as a cordless phone 33 within the range of the same cordless base unit 34. In the preferred embodiment, when the base unit is communicating with either the handset 33 or the modem 32 the other is disabled.

Figure 5:
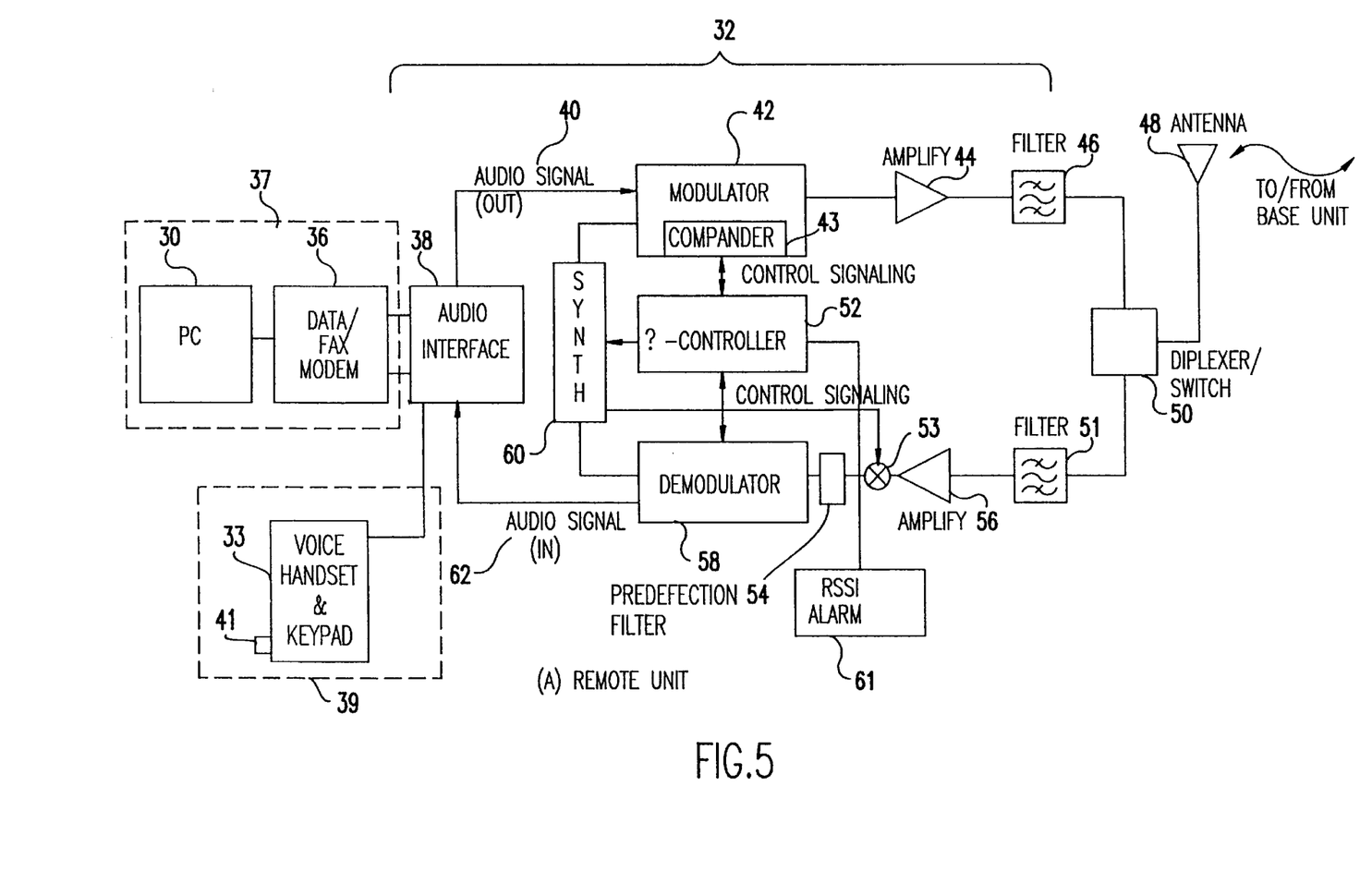
FIG. 5 is a block circuit diagram of the remote unit according to the present invention.

Referring now to FIG. 5 there is shown a block circuit diagram of the cordless remote unit 32 according to the present invention. Block 37 shows a data/fax modem 36 and PC 30 connected to the cordless remote unit 32. Similarly, block 39 shows a telephone voice handset and keypad 33 connected to the cordless remote unit 32. The telephone voice handset may include a jack 41 into which a data/fax modem may be plugged.

In the preferred embodiment, an audio interface 38 connects to either a data/fax modem and PC 37 or to a voice handset 39. The audio interface 38 outputs a baseband analog signal 40 to a modulator 42. The audio signal 40 is effectively confined to a frequency band from approximately 200 HZ to 3500 Hz. A transceiver places the analog signal 40 on an FM carrier at the modulator 42. A synthesizer module 60 is used to generate the RF frequency for modulation. The output of the modulator 42 passes through an amplifier 44 and a filter 46 and to an antenna 48. A duplexing circuit, such as a duplexer or diplexer 50, directs the amplified and filtered signal to the antenna 48 for transmission to the base transceiver unit 34. The diplexer 50 allows the cordless modem of the present invention to have full duplex capabilities. That is, it is used to separate received and transmitted signals such that signals to be transmitted are directed to the antenna 48, while signals received by the antenna 48 are directed towards the demodulator 58. Hence, the remote unit 32 of the present invention can receive and transmit data simultaneously.

When receiving modem or voice data over the telephone line to the modem and PC 37 or the voice handset 33, a modulated data signal is received from the base transceiver unit 34 by the antenna 48. The diplexer 50 routes the signal through a filter 51, amplifier 56, and a mixer 53, through a pre-detection filter 54, and finally to and demodulator 58 converts the signal to a baseband signal which is input into audio interface 38 and then to the data/fax modem 36. The cordless remote unit 32 provides security over a casual eavesdropper as the transmitted signal is a complex modem code directly generated by the modem. In addition, data encryption may be used for added security.

The bandwidth of the pre-detection filter 54 is matched to the FM deviation. For example, the pre-detection filter bandwidth used for modem data may be ten times that of a voice signal (e.g., ±50 KHz for data and ±5 KHz for voice). This greater bandwidth allows for greater dynamic range of public switched telephone network (PSTN) signals.

According to one aspect of the invention, modem data may be transmitted to an ordinary cordless base unit and complexity can be kept to a minimum by only modifying the pre-detection filter in the handset as described above. While this is not the optimum, it does permit performance very close to the unmodified cordless phone. It has virtually no impact on the range and the cost impact is that of a switch and extra filter.

Radio frequency, or RF, propagation by its very nature is subject to regions or zones of poor signal strength, commonly referred to as "dead zones". The present invention provides the user with a visual or audio feedback of the relative signal strength indicator (RSSI) value being received by the base transceiver unit 34 and by the remote transceiver unit 32. For example, by setting an RSSI alarm 61, such as a light emitting diode (LED) indicator, to flash or change color when the signal strength decreases below a certain predetermined value, the user will know to move his PC or modem slightly to improve signal reception. The microcontroller 52 can also be used to provide additional status indicators through the use of LEDs to provide a continuous time signal strength indication.

Figure 6:
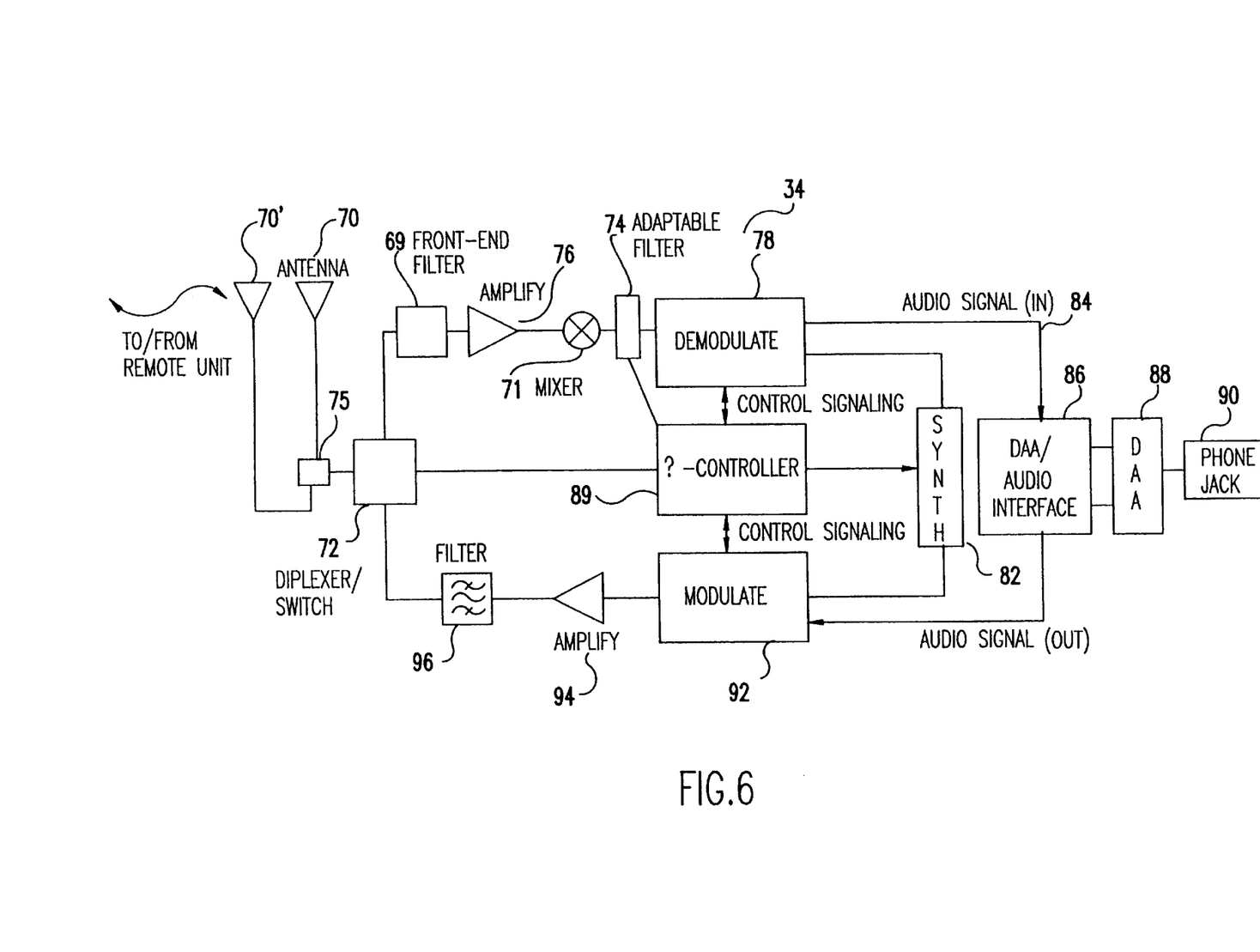
FIG. 6 is a block circuit diagram of the base unit according to the present invention.

Referring now to FIG. 6 there is shown a circuit block diagram of the base transceiver unit 34 according to the present invention. The base transceiver unit 34 is substantially the mirror image of the remote transceiver unit 32. In operation, the user initiates a voice link by piking up the phone or a data link by initiating a modem session on the computer. If a modem session is in progress, the phone is disabled (although, simultaneous voice and data may be possible based on the modem and software choice). When receiving a signal from the remote transceiver unit 32, the antenna 70 directs the signal to a duplexing circuit, such as a duplexer or duplexer 72, which routes the signal through a front-end filter 69, an amplifier 76, a mixer 71, an adaptable pre-detection filter 74, and a demodulator 78, all under the control of a microcontroller 89. If the received signal is encrypted for security reasons, the encryption is stripped prior to sending it to the user. The synthesizer 82 is used to generate the frequency for demodulation.

An audio signal 84 is input to the DAA/audio interface 86 which is input into the DAA (Data Access Arrangement) module. Every country's telephone system has what is commonly known as Data Access Arrangement or, simply DAA. DAA is the standard or the format that a modem is required to use when communicating over a particular phone system. The DAA module 88 is connected to a standard telephone wall jack 90.

When transmitting data from a telephone line via the wall jack 90 to the remote transceiver unit 32, the DAA/audio interface 86 outputs a baseband audio signal to a modulator 92. The output of the modulator 92 passes through an amplifier 94 and an adaptable filter 96 and to an antenna 70. A diplexer 72, directs the amplified and filtered signal to the antenna 70 for transmission to the remote transceiver unit 32. In addition, it may be desirable, in certain instances, to include a second antenna 70'. The use of two spatially separated antennas on the base transceiver unit 34, under the control of the microcontroller 89, may be provided to help mitigate the effects of signal fading. Though a second antenna may be included on either or both the base 34 and the remote unit 32, it is physically more practical to put the extra antenna 70' on the base unit 34 since size and power are less restrictive. The microprocessor 89 can monitor the signal strength on both antennas via an RSSI monitor and choose the antenna having the strongest signal. For example, a switch 75 may be used to switch back and forth between antennas 70 and 70'.

In operation, a radio protocol is established to enable the base transceiver unit 34 and the remote transceiver unit 32 to recognize each other. Control signals are sent between the units to establish that an outgoing call is desired or that an incoming call has been detected. This requires the generation of OFFHOOK, ONHOOK, RING, DIAL TONE, TONE, etc. signals by the transceiver units. This function is carried out by the combination of the microcontrollers 52 and 89.

The transceivers shown in FIGS. 5 and 6 allow for full duplex operation. That is, the transceivers can simultaneously transmit and receive data. However, it is also possible to use a time division duplex (TDD) architecture where the communication channel is half-duplex. That is, the transceiver either transmits or receives. This modification may be accomplished by replacing the duplexing circuits 50 and 72 with switches which are under the control of the microcontrollers 52 and 89, respectively. Because the modem link protocol requires two-way communication, it is essential that in half-duplex mode the transceivers switch between transmit and receive sufficiently fast so as not to disrupt standard modem operation. For example, a switch rate of 100 KHz is sufficient to enable half-duplex operation of the transceivers and maintain a good modem connection.

The remote transceiver unit 32 of the data/fax modem of the present invention may be packaged in a PCMCIA form (Personal Computer Memory Card International Association). This type of memory card is designed to be plugged directly into an available slot on a PC. The remote transceiver unit 32 may also be designed as a separate boxed package which can be mounted on the back of a laptop display and connected via a cord to an existing data/fax modem. The remote transceiver unit 32 may also be designed as a single chip or small combination of chips placed directly on a system board.

The base transceiver unit 34 is contained in a single unit and may be powered by either a battery or an AC adapter. The remote transmit and base receive channel are centered near 907 MHZ (in the ISM band) while the base transmit and remote receive channel are centered at 924 MHZ (also in ISM band). The audio and control signals are modulated onto an FM carrier and transmitted over the air. Control signals exchanged between remote and base radio units, 32 and 34, using a frequency shift key (FSK) code which the demodulators, 58 and 78, are also designed to decode. The transmitted signal levels are kept below 50 mV/m at 3 meters to comply with the FCC Part 15 low power rules.

Unfortunately, the signal level at a given telephone wall outlet can easily vary over a 20 dB dynamic range (e.g., from as little as −29 dBm to as large as −9 dBm). Hence, it is important that the base unit 34 be capable of controlling dynamic range automatically. Accordingly, the FM modulator 92 is designed to handle this dynamic range and therefore has the capability of deviating, for example, from +/−5 KHZ to +/−50 Khz. Alternatively, deviation control can be handled in a number of other ways. One example is to use an automatic gain control (AGC) circuit to moderate the voltage that is applied to the modulator to keep the deviation in an acceptable window. Another is the use of a compander 43, though signal distortion and control may be more difficult.

The audio signal recovered at the remote unit 32 must have a SINAD of greater than 32 dB over this entire range of deviation, in order to support a 28.8 kbps data/fax modem protocol. Hence, the pre-detection filter 54 bandwidth that it must be at least as wide as the incoming signal (i.e., +/−50 Khz). As discussed earlier, the penalty for using the wider bandwidth is decreased receiver sensitively threshold or shorter range. Since cordless voice telephones are not concerned with the ultimate SINAD achievable and typically have a SINAD around 12–25 dB, they sometimes design in compandors (compressor/expandors) which logarithmically compress the signal, usually according to either A-law or mu-law standards. The compressed signal varies much less in amplitude and therefore the deviation is constrained to approximately +/−15 KHz allowing the use of narrower filters and thereby improved threshold and greater range. Unfortunately, while fine for voice transmission, low cost compandors add distortion and hold the SINAD below the required 32 dB.

Figure 7:
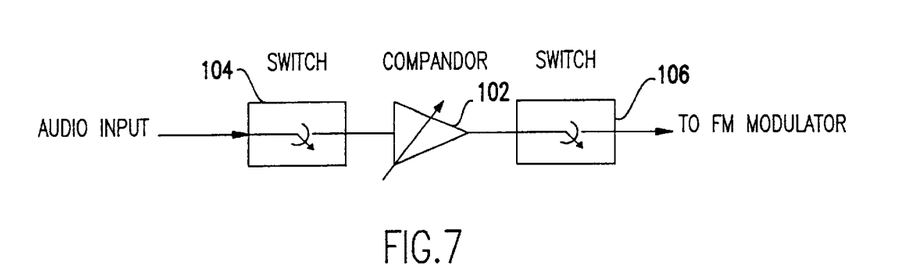
FIG. 7 is a circuit for a switch in/out compander.

Referring to FIG. 7, this invention includes switches 104 and 106 for bypassing the compandor 102 under the control of the microcontroller 52. If the remote unit 32 is transmitting voice data, switches 104 and 106 are closed and the audio input is routed through the compandor 102 to the modulator 42. Alternatively, if the remote unit 32 is transmitting modem data, switch 104 connects to bypass the compandor 102.

In addition, a new implementation of automatic gain control (AGC) is being addressed that does not distort the signal as much, increasing the potential SINAD above 32 dB. It consists of sampling the incoming and outgoing levels as well as the local echo signal. Based on this measure the applied voltage to the modulator is scaled to a suitable range.

In operation, upon receiving an off-hook signal or an incoming call signal, the base unit 34 identifies the type of data (i.e., voice or computer modem data) and adapts accordingly by placing the FM modulator 92 in either of a narrow band deviation or a wide band deviation covering the required range of the particular signal combined with local echo. That is, when voice data is present, a low deviation, narrow filter combination is selected. If, on the other hand, the computer data from the cordless modem is detected, a higher deviation, wider bandwidth filter is selected.

Figure 8:
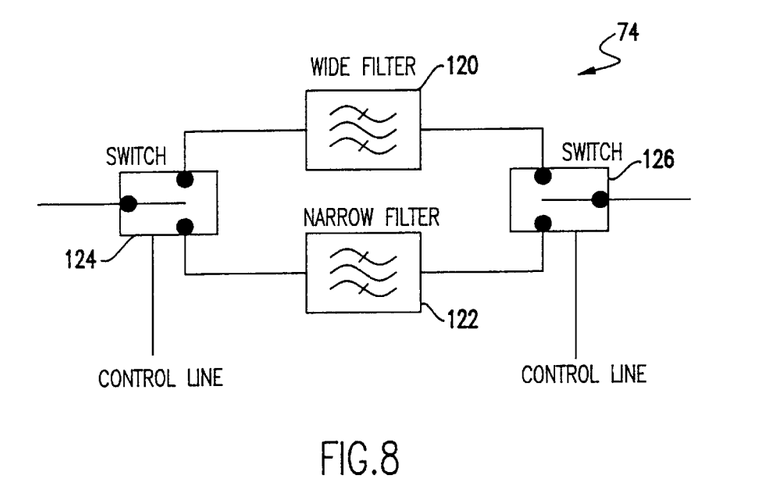
FIG. 8 is a switching circuit for switching between a wide band filter for modem data transmission and a narrow band filter for voice transmissions.

Referring to FIG. 8, the predetection 74 (shown in FIG. 6) comprises both a wide bandwidth filter 120, for example ±50 KHz, and a narrow bandwidth filter 122, for example, ±10 KHz. Switches 124 and 126 are connected by control lines to the microcontroller 89 to control the switched 124 and 126 to select the wide bandwidth filter 120 if computer data is detected or the narrow filter if voice data is detected. Alternatively, the particular filter set used may be determined mechanically, such as by plugging an RJ11 jack into a cordless phone handset or using a mechanical selector switch. Similarly an electrical stimulus, such as a control signal from base to mobile unit, may be used to select the appropriate filter. Another implementation of the adaptable filter 74 is to have an electronically tuneable filter that adaptively changes for the given condition.

Figure 9A:
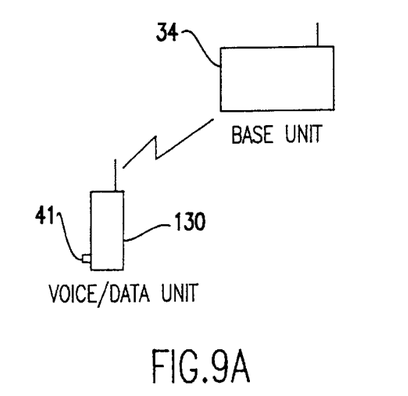
FIG. 9A is a block diagram showing a voice handset combined with a remote data unit.

One embodiment is for the base unit 32 to selectively discriminate between signals received from a telephone voice handset 33 and data signals received from a PC modem 36. Referring to FIG. 9A, a second embodiment of the invention is shown where a combination voice and data unit 130 communicating with a base 34. Here, a voice handset is equipped with a jack 41 into which a modem can be plugged.

Figure 9B:
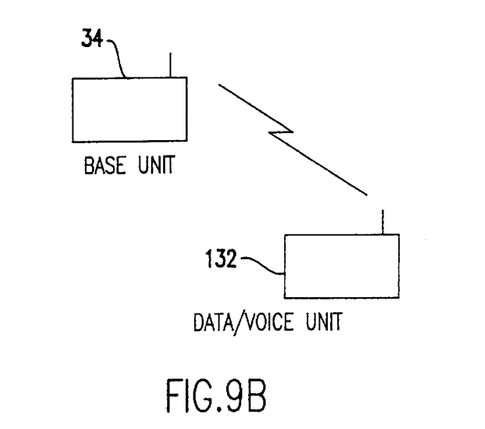
FIG. 9B is a block diagram showing a remote hand unit which also has voice capabilities.

Similarly, FIG. 9B shows a third embodiment of the invention where a the base unit 34 communicates with a combination data/voice unit 132. In this case, a remote unit connected to a modem allows telephony functions through a speaker in the PC.

With regard to security, it is sometimes not advisable to transmit "simple" FM over the airwaves since simple FM may be intercepted by an unwanted eavesdropper. Additionally, the FM signal of the cordless modem may also be subject to momentary fades or drop-outs caused by changes in the environment or by jamming caused by other wireless devices operating in the same RF spectrum. Accordingly, FIG. 10 shows a block diagram of the cordless modem according to the present invention using a pseudo-random number (PN) code which addresses both of these problems.

Figure 10:
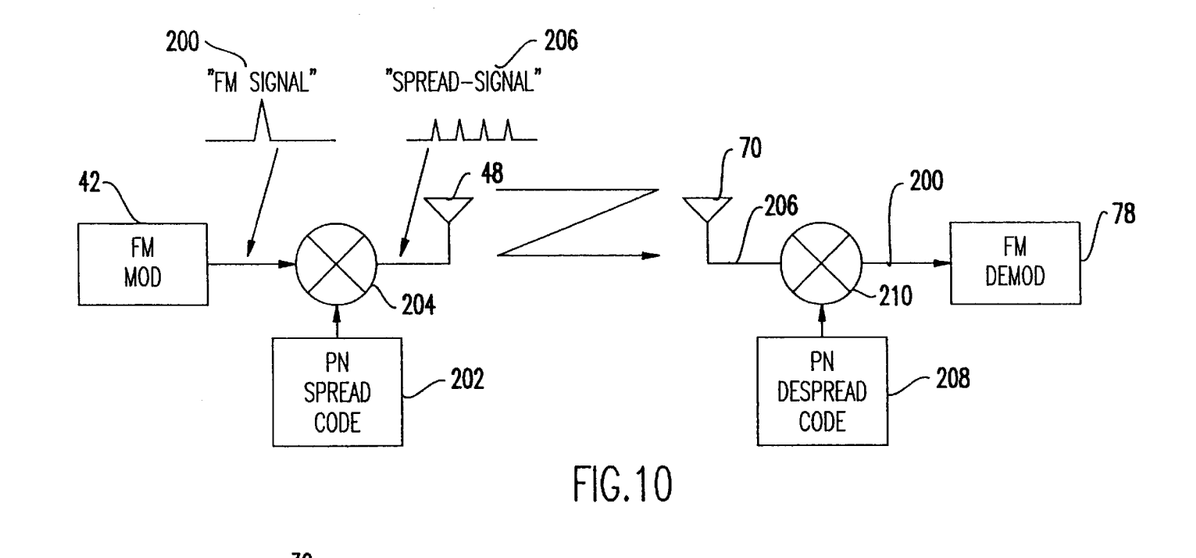
FIG. 10 is a block diagram of the cordless modem according to the present invention using a pseudo-random number (PN) code to create a secure channel.

Referring now to FIG. 10, the FM signal 200 from, for example, the FM modulator 42 of FIG. 5, is multiplied by a PN-code using a PN-code generator 202 and mixer 204 to create a direct sequence spread spectrum signal 206. Accordingly, prior to demodulation 78 of FIG. 6, a complementary PN-code generator 204 and mixer is used to recover the FM signal 206. In the preferred embodiment, the modulator 42 of the remote unit and the demodulator 78 of the base unit are both subject to a same first PN-code. Similarly, the modulator 92 of the base unit and the demodulator 58 of the remote unit are both subject to a same second PN-code, which may be the same or different than the first PN-code.

Using PN-codes, eavesdroppers are not able to descramble transmitted signals without the appropriate PN-codes. This offers a high degree of security. In addition, the PN-code spreads the FM signal over a wide RF band. The amount of spreading is determined by the chipping rate of the code. For example, a PN-code applied at a rate of 2 Mbps would spread an 80 KHz wide FM signal over 4 MHZ. The benefit of spreading makes the cordless modem more immune to narrow band jammers (i.e. other devices operating within the 4 MHZ wide band) and reduces momentary frequency selective fades.

Figure 11:
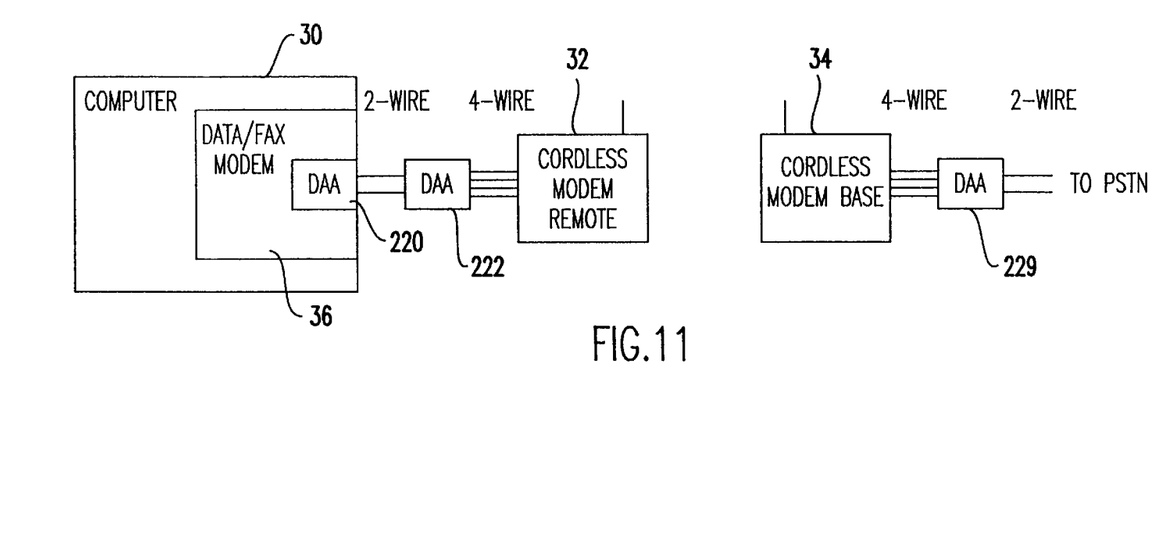
FIG. 11 is a block diagram of the cordless modem according to the present invention using an additional Data Access Arrangement (DAA) to permit a 2-wire to 4-wire connection.

Referring again to FIG. 5, many mobile computer users already have data/fax modems 36 installed in their computers 30. These modems 36 have a variety of interface connectors which mate to a 2-wire telephone cord. The common connector at the end of this cord is the popular RJ-11 phone plug. Referring now to FIG. 11, in an alternate embodiment of the present invention, the cordless modem 32 can interface to either the particular 2-wire connector at the data/fax modem 36 or to the end of the RJ-11 plug. This can be achieved by adding an additional Data Access Arrangement (DAA). As shown in FIG. 11 a second DAA module 222 accepts a 2-wire connection from a first DAA module 220 which converts the 2-wire signal interface from the modem to the 4-wire signal interface used by the radio in the cordless modem remote unit 32. Similarly, a third DAA module 224 is used to convert the 4-wire signal cordless modem base 34 to the 2-wire signal compatible with an RJ-11 connector jack. It is noted that with this arrangement, different DAA modules may be used to accommodate many different types of jacks and connectors, such as, for example, x-jack connectors or flat connectors.

The ideal architecture for the cordless modem is to interface the mobile unit transceiver to the 4-wire interface at the modem data pump. Here the transmit and receive signals are available on separate pins. In addition, the signaling for ring detect and off-hook are logic level input and output from the system's microcontroller unit. However, the disadvantage with this approach is that the interface between the modem and the radio transceiver often becomes proprietary and the market is therefore limited to those customers who are willing to purchase an entire system including modem, radio transceiver pair and base station.

Figure 12:
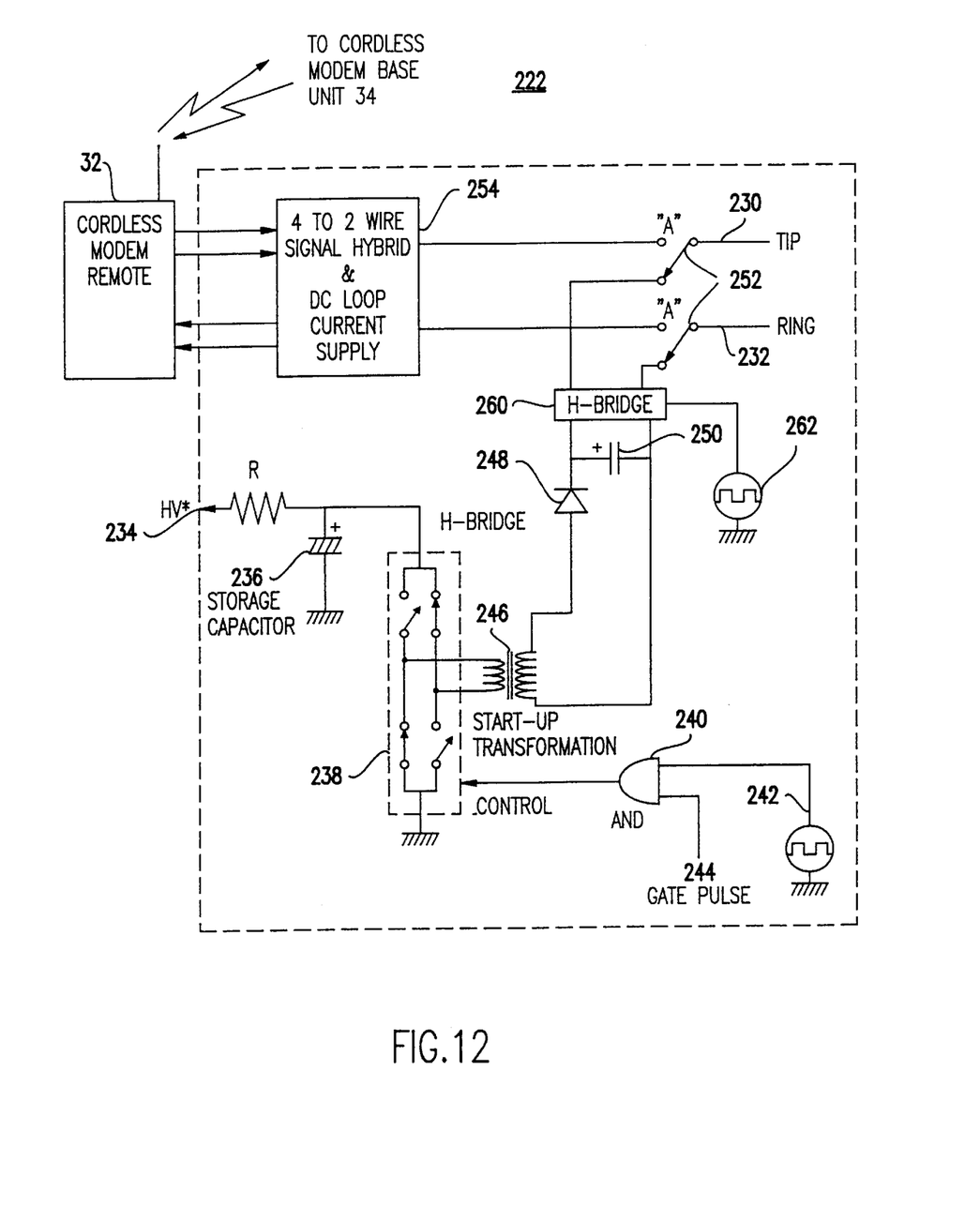
FIG. 12 is a circuit for connecting the cordless modem remote unit of the present invention to a plain old telephone system (POTS) modem's tip and ring terminals.

Therefore, referring now to FIG. 12, there is provided the DAA circuit 222 for connecting the cordless remote unit 32 of the present invention to the two wire tip 230 and ring 232 interface which is standard for all plain old telephone system (POTS) modems. With this architecture it is possible for the cordless modem of the present invention to be compatible with all existing POTS modems. To do this requires two additional 2 to 4 wire hybrids and a circuit for providing ring detection and off-hook signaling.

To detect off-hook signaling, when the modem 36 goes off-hook the impedance at the tip and ring terminals, 230, and 232, respectively, drops to approximately 600 ohms which can be detected. This drop triggers the transmission of a control code from remote unit 32 to base unit 34, directing the base unit 32 to go off-hook. At the end of a "conversation" a detected increase in impedance can be used to signal the on-hook state.

The ring re-generation detection is somewhat more difficult. The telephone company's central office typically uses an 85V rms (root mean square), 17 to 68 Hz signal with a 2 sec. on 4 sec. off cadence (pattern), to signal a subscriber of an incoming call. This signal is typically converted by a ring detection circuit in the modem's DAA 220 to produce a logic level pulse train having the same frequency and cadence of the incoming signal. The difficulty is that the power required for these detection circuits to generate a valid pulse train can be as much as 0.4W and the voltage of the signal at tip and ring terminals, 230 and 232, must be approximately 200V peak to peak. In addition, once a call has been established, there must be a bias current supplied so that the modem will remain off-hook and to prevent distortion of the analog signal.

When an incoming call is received by the base unit 34 a control code is transmitted over the radio link to the remote unit 32. The circuit shown in FIG. 12 generates a ring signal similar to the one received by the base unit 34. Power is supplied by a 5V or higher voltage source 234 and a large storage capacitor 236 is used to meet the burst power requirements. An H-Bridge 238 is used to "chop" the 5V power source and is controlled by an AND-gate 240 whose inputs are a pump waveform 242 and a gate pulse 244 which is enabled only for the duration of the ring voltage duration. A step-up transformer 246 and diode 248 and filter capacitor 250 are used to generate a 200 V dc potential that will trigger the modem's ring detect circuit. A second H-bridge 260 then serves to commutate the waveform into an AC waveform suitable for coupling into the modem's ring select circuits. The bridge is controlled by waveform 262 which permits both a two-second/four-second on/off cadence as well as a nominal AC chopping frequency usually on the order of 20 Hz. Once the modem goes off-hook, the double-pull, double-through (DPDT) switch 252 at A is used to disconnect tip and ring terminals, 230 and 232, from the ring generation circuit and to connect it to the DC loop current and 4 to 2 wire hybrid circuit 254.

While the invention has been described in terms of a single preferred embodiment, those skilled in the art will recognize that the invention can be practiced with modification within the spirit and scope of the appended claims.

We claim:

1. A radio pair for cordlessly connecting a modem to a standard telephone line, comprising:
   a base unit pluggable into a telephone jack connected to a telephone line,
   said base unit comprising:
      a first data access arrangement (DAA) module for converting a signal from said telephone jack into a 4-wire signal;
      a first radio transceiver connected to said first DAA module for transmitting and receiving data over the telephone line; and
   discrimination means for discriminating between data signals received from said modem and signals received from a telephone voice handset; and
   a remote unit connectable to a modem interface with a telephone jack, said remote unit comprising:
      a second DAA module for converting the 4-wire signal into signal compatible with said modem interface; and
      a second radio transceiver connected to said second DAA module for transmitting and receiving data to and from said first radio transceiver in said base unit.

2. A radio pair as recited in claim 1 wherein said telephone jack comprises an RJ-11 connector.

3. A radio pair as recited in claim 1 wherein said telephone jack comprises an x-jack connector.

4. A radio pair as recited in claim 1 wherein said telephone jack comprises a flat connector.

5. A radio pair as recited in claim 1 wherein said modem interface comprises an RJ-11 connector.

6. A radio pair as recited in claim 1 wherein said modem interface comprises an x-jack connector.

7. A radio pair as recited in claim 1 wherein said modem interface comprises a flat connector.

8. A radio pair for cordlessly connecting a modem to a standard telephone line as recited in claim 1 wherein said second DAA module comprises:

means for detecting an impedance drop across tip and ring terminals of said modem to detect an off-hook condition; and means for detecting an impedance increase across said tip and ring terminals of said modem to determine an on-hook condition.

9. A radio pair for cordlessly connecting a modem to a standard telephone line as recited in claim 1 wherein said second DAA module includes a ring detection circuit comprising:

means for receiving an incoming call code signal from said base unit;

a storage capacitor connected to a power supply for storing a charge voltage needed to generate a ring voltage waveform;

a first bridge and transformer connected to said storage capacitor for stepping up said charge voltage to a higher voltage to energize a ring detection circuit;

a second bridge for commutating said high voltage into a waveform having a frequency and cadence emulating a telephone ring voltage waveform.

10. A device for cordlessly connecting a modem to a telephone line, comprising:

a base unit adapted to be plugged into a telephone jack hard-wired to a telephone line and a remote unit having a telephone jack adapted to be connected to a modem, at least one of said base unit and said remote unit comprising a data access arrangement (DAA) module for making the modem compatible with the telephone line; and a first wide-band radio transceiver in said base unit;

a second wide-band radio transceiver in said remote unit for communicating with said first wide-band radio transceiver;

said first wide-band radio transceiver for modulating a first analog signal from the telephone line on a frequency modulation carrier and for demodulating a second signal received from said second wide-band radio transceiver in said remote unit, and transmitting said second signal over the telephone line;

said second wide-band radio transceiver for modulating an analog signal from said modem on a frequency modulation carrier and for demodulating a signal received from said first wide-band radio transceiver in said base unit.

11. A device as recited in claim 10 wherein said first and said second wide-band transceivers comprise a direct digital synthesis modulator.

12. A device as recited in claim 10 wherein said first and said second wide-band transceivers comprise a crystal modulator and a multiplier.

13. A device as recited in claim 12 said multiplier comprises a frequency multiplier.

14. A device as recited in claim 10 wherein said first and said second wide-band transceivers comprise a phase-lock-loop modulator.

15. A device as recited in claim 10 wherein said first and said second wide-band transceivers comprise an offset upconverter and multiplier.

16. A device as recited in claim 10 further comprising:

pseudo-random number (PN) code generator means, connected to said first wide-band transceiver and said second wide-band transceiver, for further modulating said first analog signal from the telephone line and said analog signal from said modem.

17. A method for cordlessly communicating data between a modem and a telephone line, comprising the steps of:

connecting a base unit comprising a first transceiver to a telephone line jack connected to the telephone line;

connecting a remote unit comprising a second transceiver to a modem with a telephone jack positioned on said remote unit;

sending control signals between said first transceiver and said second transceiver to establish recognition between said base unit and said remote unit;

modulating modem data signals from said telephone line on a first frequency modulation carrier and modulating modem data signals from said modem on a second frequency modulation carrier;

modulating said first frequency modulation carrier with a first pseudo-random code number;

modulating said second frequency modulation carrier with a second pseudo-random code number;

transmitting and receiving said first and said second frequency modulation carriers between said first transceiver and said second transceiver; and demodulating said first and said second frequency modulation carriers.

18. A method for cordlessly communicating data between a modem and a telephone line as recited in claim 17 wherein said first pseudo-random code number and said second pseudo random code number are identical.

* * * * *